C. W. SALADEE.
Vehicle Spring.
No. 113,573. Patented April 11, 1871.
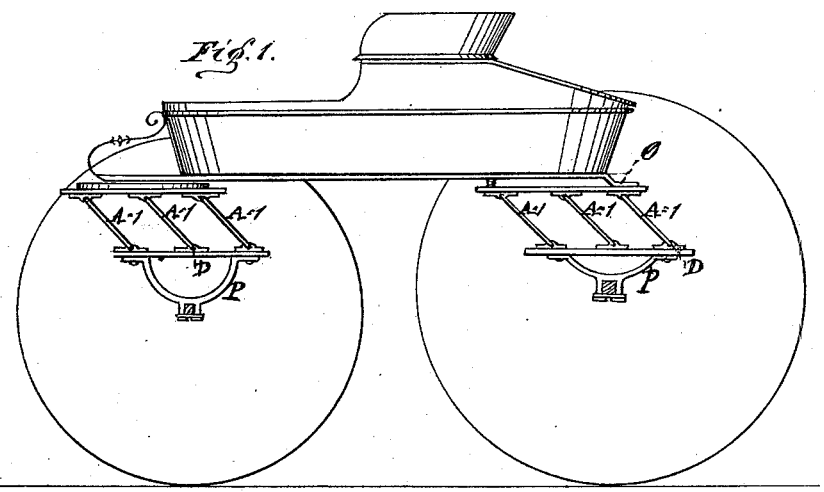
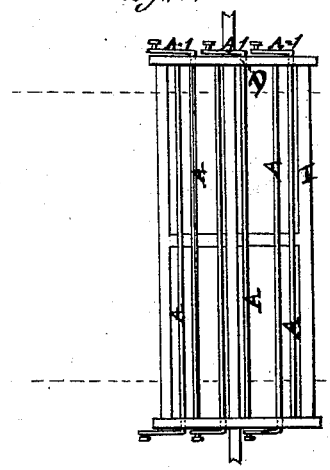 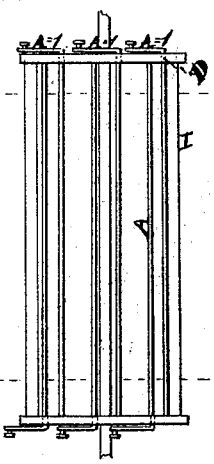
Witnesses. Inventor.

UNITED STATES PATENT OFFICE.

CYRUS W. SALADEE, OF ST. CATHARINES, CANADA, ASSIGNOR TO C. W. SALADEE & CO.

IMPROVEMENT IN SPRINGS FOR VEHICLES.

Specification forming part of Letters Patent No. 113,573, dated April 11, 1871.

*To all whom it may concern:*

Be it known that I, CYRUS W. SALADEE, of St. Catharines, county of Lincoln, Province of Ontario, and in the Dominion of Canada, have invented certain new and useful Improvements in Springs for Wheeled Vehicles, and for other purposes; and I do hereby declare that the following is a full, clear, and exact description thereof, reference being had to the accompanying drawing, and to the letters of reference marked thereon.

The nature of my invention consists in a combination of two or more torsion-springs connected and operating together, when placed over and on a line with the front and back axles of the vehicles.

In the drawing, Figure 1 represents the side elevation of a buggy to which is applied my combination of torsion-springs as a platform-spring, there being six springs used on each side—three in front and three behind.

In the modification here shown (see Figs. 2 and 3) the spring A is perfectly straight, and on one end is formed or attached the crank or lever A', which is allowed to play freely in bearings D, while the opposite end is firmly held in position in the bearing D on the frame I. In this way I propose combining as many springs A as the weight to be carried may require.

The bearings D, I propose forming upon the end of an appropriate ornamental standard, P, which I may bolt or clip directly to the axle behind or the head-block in front, and which manner of making these bearings will admit of a great variety of style, to suit the fancy of the manufacturer, and thus produce the springs in sets of two, four, or any other required number.

The ends of the cranks or levers A' are secured to the frame or body of the vehicle in any manner that will allow them to vibrate freely at their point of connection.

Now, what I claim as new, of my invention, and desire to secure by Letters Patent, is—

The arrangement and combination of the springs A A, when placed on a line with the axles of the vehicle, and operating in combination with the levers or cranks A' and the bearings D, substantially as and for the purpose shown and described.

In testimony that I claim the above-described certain new and useful improvements in springs for wheeled vehicles and other purposes, I have hereunto signed my name this 23d day of March, 1871.

CYRUS W. SALADEE.

Witnesses:
V. C. CLAYTON,
EDM. F. BROWN.